Oct. 11, 1938.  A. G. BRACKENBURY  2,132,934
SLACK ADJUSTER
Filed Nov. 10, 1936  2 Sheets-Sheet 1
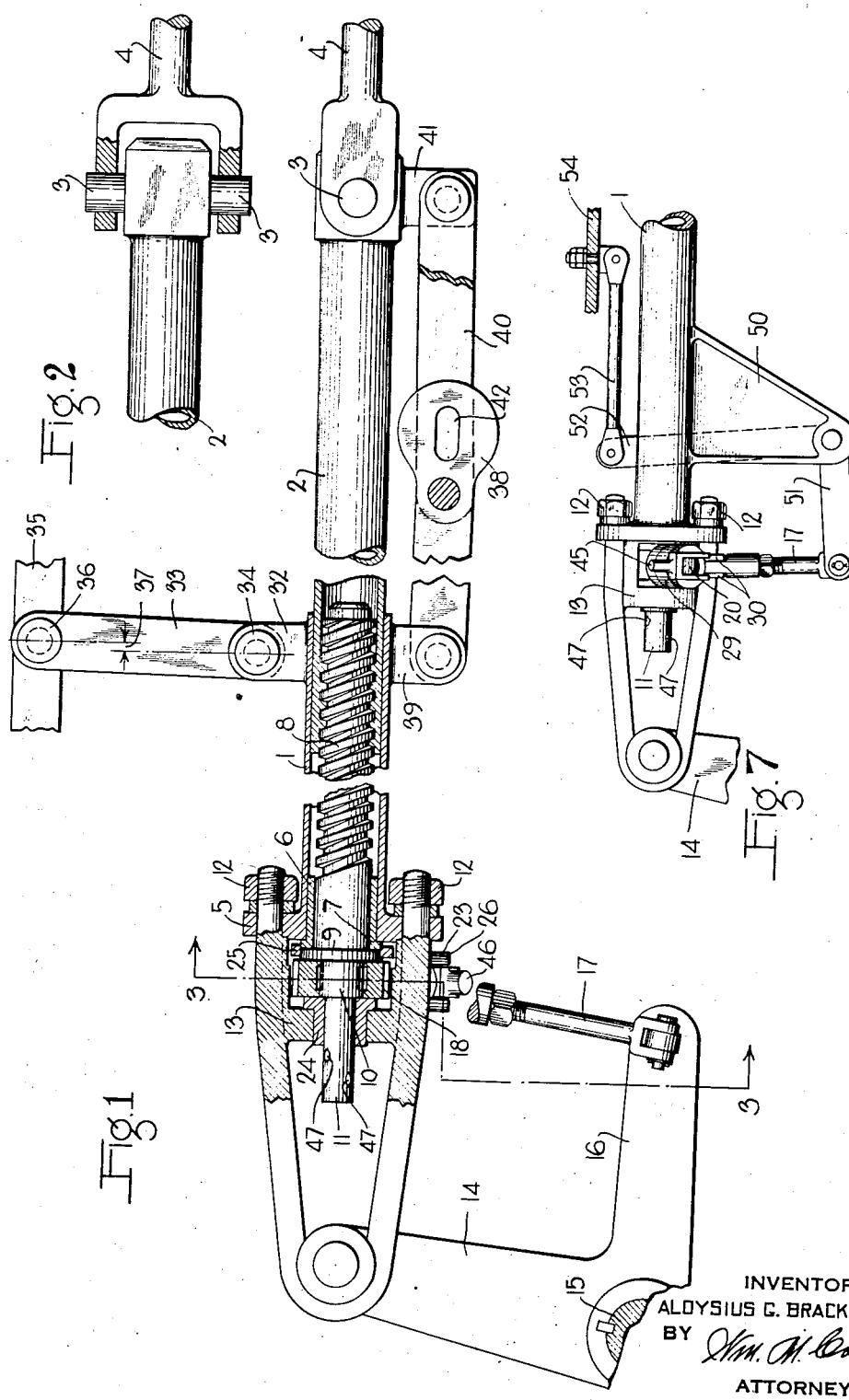
INVENTOR
ALOYSIUS G. BRACKENBURY
BY Wm. W. Cady
ATTORNEY Oct. 11, 1938.  A. G. BRACKENBURY  2,132,934
SLACK ADJUSTER
Filed Nov. 10, 1936  2 Sheets-Sheet 2
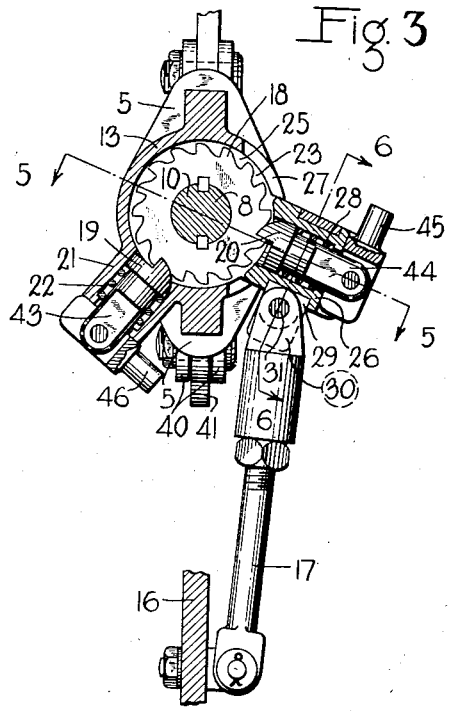
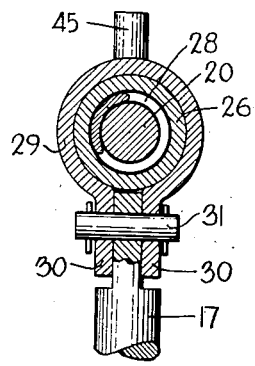
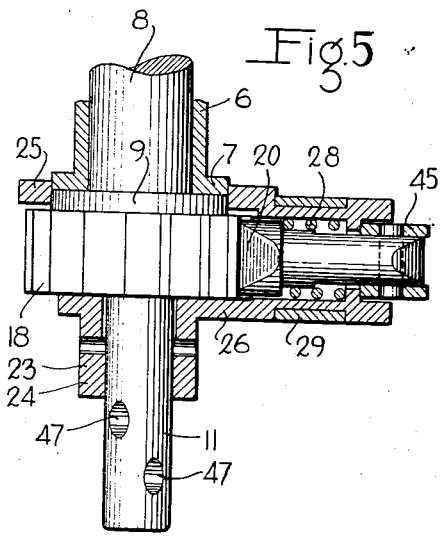
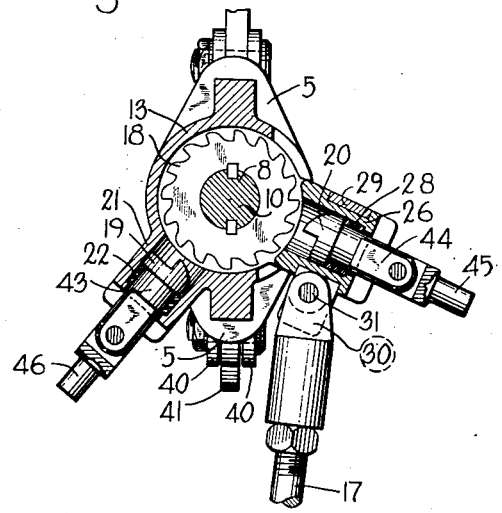
INVENTOR
ALOYSIUS G. BRACKENBURY
BY Wm. M. Cady
ATTORNEY Patented Oct. 11, 1938

2,132,934

UNITED STATES PATENT OFFICE 2,132,934

SLACK ADJUSTER

Aloysius Graham Brackenbury, London, England, assignor to The Westinghouse Air Brake Company, Wilmerding, Pa., a corporation of Pennsylvania Application November 10, 1936, Serial No. 110,088
In Great Britain December 4, 1935

3 Claims. (Cl. 188—202)

This invention relates to automatic slack adjusting devices for braking apparatus on railway and other vehicles, and more particularly to that type of device comprising two relatively movable parts having cooperating screw threads, one of which parts is adapted to be displaced, automatically upon movement of the brake rigging and relatively to the other parts in one direction so as to decrease the effective length of the device as a whole in accordance with the amount of slack in the rigging.

The principal object of the present invention is to provide an improved slack adjusting device of the above mentioned type.

Another object of the invention is to provide supporting means for a longitudinally movable slack adjusting device which is so connected to the device and a fixed part of the vehicle that the force of gravity will tend to normally maintain the device in its release position or tend to move the device to such position when the brakes are being released. This object I attain by so arranging the points of attachment of the supporting means that the center of one will be at one side of a vertical line passing through the center of the other.

Other objects and advantages will appear in the following more detailed description of the invention.

In the accompanying drawings, Fig. 1 is a side elevational view, partly in section, of a slack adjusting device embodying the invention, portions of the brake rigging and a relatively fixed part of the vehicle being shown; Fig. 2 is a plan view partly in section, of one end of the slack adjusting device and a cooperating brake rod; Fig. 3 is an enlarged cross-sectional view of the slack adjusting device taken on the line 3—3 of Fig. 1 and Fig. 4 is a similar cross-sectional view showing the locking and driving pawls maintained out of operative engagement with the ratchet wheel; Fig. 5 is a fragmentary sectional view of the device taken on the line 5—5 of Fig. 3; Fig. 6 is a fragmentary sectional view taken on the line 6—6 of Fig. 3; and Fig. 7 is a fragmentary side elevational view of a modification of the device.

Referring now in detail to the drawings, the slack adjusting device illustrated in Figs. 1 to 6, inclusive, may comprise a hollow tubular casing 1 in which an internally screw-threaded sliding member 2 is adapted to slide axially. This member projects from the right hand end of the casing 1 and adjacent its outer end is provided with trunnions 3 which project at right angles to the axis of the member, said member being operatively connected to a rod 4 of the brake rigging by means of the trunnions.

The left hand end of the casing 1 is provided with flanges 5, and arranged interiorly of this end of the casing and carried thereby is a bush 6 having an annular shouldered end portion 7 which engages the end face of the casing.

A rod 8 provided with external screw threads cooperating with the internal screw threads of the sliding member 2 is, for the greater portion of its length, contained within the casing 1 and is rotatably journaled in the bush 6.

The left hand end portion of the rod 8 projects beyond the shoulder end portion 7 of the bush 6 and is provided with a circular collar 9 which bears against the portion 7 and which is rotatable with the rod relative to the bush.

To the left of the collar 9 the projecting end portion of the rod for a portion of its length is reduced in diameter as indicated at 10 and for the remainder of its length is further reduced in diameter as indicated at 11.

Secured to the flanges 5 of the casing 1 by means of nuts 12 or any other desired means and extending outwardly therefrom is a housing 13 which, at its outer end, is operatively connected to an arm 14 of a bell crank lever secured in any desired manner to a rotary brake shaft 15, the arm 16 of the lever being operatively connected to one end of an operating link 17 which will be hereinafter more fully described.

Mounted on the reduced end portion 10 of the rod 8 and keyed thereto is a ratchet wheel 18 with which a locking pawl 19 and a driving pawl 20 is adapted to cooperate.

The locking pawl 19 is slidably mounted in a hollow portion 21 of the casing and is normally held in locking engagement with the ratchet wheel 18 by the action of a coil spring 22 as shown in Fig. 3.

The driving pawl 20 is carried by a lever 23 which comprises spaced end pieces 24 and 25, arranged one at each side of the ratchet wheel 18, which end pieces are integrally connected together by a hollow arm 26 which extends at an angle to the axis of the rod 8 through an opening 27 formed in the housing 13. The end piece 24 is rockably mounted in the housing 13 and serves as a bearing for the reduced end portion 11 of the rod 8, while the end piece 25 is rockably mounted on the peripheral surface of the collar 9. The driving pawl 20 is slidably mounted in the arm 26 and is yieldably urged into contact with the toothed portion of the ratchet wheel 18 by the action of a coil spring 28 as shown in Figs. 3 and 5.

Exteriorly of the housing 13 there is rotatably mounted on the arm 26 a member 29 which surrounds the arm and has spaced arms 30 between which one end of the link 17 extends and to which the link is operatively connected by means of a pin 31. On some vehicles the rod 4 of the brake rigging is arranged above the level of the brake shaft 15 as shown in Fig. 1 and on other vehicles the rod is arranged below the level of the shaft. Since the member 29 is rotatably mounted on the arm 26, the link 17 can occupy an operative position either above or below the axis of the slack adjusting device. Such adjustability of the link 17 enables the slack adjusting device to be readily mounted on any vehicle whether the brake shaft is above or below the level of the rod 4.

The tubular casing 1, adjacent its right hand end, is provided with a lug 32 which extends outwardly at right angles to the axis of the casing and which is pivotally connected to the lower end of a supporting hanger 33 by means of a pin 34, the upper end of the hanger being pivotally connected to a relatively fixed part 35 of the vehicle by means of a pin 36. It will here be noted that, with the brake released, the axis of the pivotal connection between the hanger 33 and the vehicle part 35 is, as indicated by the reference character 37 in Fig. 1, slightly to the right of a vertical line passing through the axis of the connection between the lug 32 and the lower end of the hanger. The purpose of this hanger or supporting arrangement will be apparent from the following description of the operation of the slack adjuster.

In operation, when the brake shaft 15 is rotated in an anticlockwise direction in order to effect an application of the brakes, the bell crank lever is moved in the same direction and moves the slack adjusting device as a whole and brake rod 4 towards the left so as to apply the brakes, it being understood that the effort exerted on the casing 1 by the bell crank lever is transmitted through the externally screw-threaded rod 8 and through the flanges 5 of the casing 1, the shoulder portion 7 on the bush 6 and the collar 9 on the rod 8.

At the same time, the bell crank lever through the intermediary of the link 17 connected thereto rotates the lever 23 carrying the driving pawl 20 about the reduced end portion 11 of the rod 8 and the collar 19 in an anti-clockwise direction, so that the pawl 20 slides on the back of a tooth on the ratchet wheel 18, which ratchet wheel is held stationary under these conditions by the locking pawl 19, but if the slack in the rigging does not exceed a predetermined amount, the driving pawl will not engage with the next tooth on the ratchet wheel. When the brakes are subsequently released under these conditions, the return of the pawl 20 to its original position is effected without rotation of the ratchet wheel 18 and the slack adjusting device as a whole and the brake rigging is returned towards the right, the return of the parts to their correct original release position being effected by the force of gravity since the link 33, by which the slack adjusting device is suspended from the vehicle part 35, is arranged to provide for such movement. It should here be mentioned that in Fig. 1 the several parts of the brake rigging are shown in their release position so that the slack adjuster cannot be moved toward the right from the position in which it is shown.

If, however, the slack in the rigging exceeds the predetermined amount, the driving pawl 20 upon application of the brakes, will engage the next tooth on the ratchet wheel 18 and when the brakes are released will consequently rotate the ratchet wheel 18 and the screw-threaded rod 8. Rotation of the internally screw-threaded sliding member 2 is prevented by its connection to the brake rod 4 and consequently the screw-threaded portion of the rod 8 is screwed into the sliding member 2, thus shortening the slack adjusting device as a whole and taking up the slack in the rigging, by drawing the sliding members 2 into the casing 1.

A signal arm 38 is pivotally mounted at one end on a downwardly extending bracket or lug 39 on the casing 1, this arm being connected by a link 40 through a downwardly extending bracket or lug 41 on the outer end of the sliding member 2, so that, when the slack adjusting mechanism is adjusted to its maximum length with the sliding member extending to its maximum extent outside the casing, the signal arm 38 will be parallel with the sliding member as shown in Fig. 1. As wear of the brake shoes occurs and the slack adjusting mechanism functions to take up the slack in the rigging, the movement of the sliding member 2 towards the left into the casing will rotate in a clockwise direction the signal arm 38 around its pivotal connection with the bracket or lug 39 on the casing 1 until, when the slack adjusting device needs resetting the arm is extending vertically downward. In the lower end of the signal arm 38 is a slot 42 which can readily be seen owing to the passage of light therethrough when the mechanism requires resetting. It should here be mentioned that the axis of the pivotal connection between the arm 38 and link 40 is located slightly below a straight line drawn through the axis of the pivotal connections between the outer ends of the arm 38 and link 40 and the lugs 39 and 41 so as to prevent the arm and link from acting to lock the adjusting mechanism against adjustment.

In order to facilitate the resetting of the device, the two pawls, 19 and 20 are respectively provided with stems 43, 44, which are provided with rockable levers 45, 46, which when moved to the position in which they are shown in Fig. 4 move the pawls out of engagement with the ratchet wheel 18 against the opposing action of the springs 22 and 28, respectively, said levers being adapted to maintain the pawls in this position while resetting is effected by rotating the screw-threaded rod by means of a tool adapted to engage the reduced end portion 11 of the rod, this portion of the rod being preferably provided with openings 47 for the reception of such a tool.

Referring now to Fig. 7, instead of arranging for a bell crank lever both to apply the brakes and rotate the ratchet wheel 18 as described hereinbefore with reference to Fig. 1, the braking effort may be arranged to be exerted on the casing 1 of the slack adjusting device and transmitted through the two screw-threaded members 4 and 2 as before, while the rotation of the ratchet wheel 18 is effected by a bell crank lever mounted upon a bracket 50 of the casing 1, one arm 51 of this bell crank lever being connected by the link 17 to the member 29 carrying the driving pawl 20 and the other arm 52, of this lever being anchored by a link 53 to a fixed part 54 of the vehicle, so that relative movement of the slack adjusting device with respect to the fixed part 54 of the vehicle will cause the bell crank lever to rotate and actuate the driving pawl 20 in accordance with the extent and direction of such movement.

While two illustrative embodiments of the invention have been described in detail, it is not my intention to limit its scope to these embodiments, or otherwise than by the terms of the appended claims.

Having now described my invention, what I claim as new and desire to secure by Letters Patent, is:

1. In combination with a brake rigging for a vehicle, comprising a pull rod, a rotatable brake shaft, a lever carried by said shaft and rotatable thereby, a slack take-up device extending between and operatively connecting said lever and rod and movable longitudinally by said lever to actuate said rod, and flexible means for supporting said slack take-up device from a relatively fixed part of the vehicle, the point of attachment of said flexible means to said fixed part being slightly to one side of a vertical line passing through the center of the point of attachment of the means to said slack take-up device.

2. In combination with a brake rigging for a vehicle, comprising a pull rod, a rotatable brake shaft, a lever carried by said shaft and rotatable thereby, a slack take-up device extending between and operatively connecting said lever and rod and movable longitudinally by said lever to actuate said rod, said slack take-up device comprising a casing, a slack take-up element in telescopic relation to one end of said casing and being movable longitudinally relative to said casing, means mounted in said casing operative to actuate said slack take-up element, and flexible means connected to said casing and a fixed part of the vehicle for supporting the slack take-up device, the center of the point of attachment of said flexible means to said fixed part being slightly to one side of a vertical line passing through the center of the point of attachment of the means to said casing.

3. In combination with a brake rigging for a vehicle, a slack adjusting device included in said rigging movable longitudinally in controlling the brakes and operative to take up slack in the rigging when the slack is excessive, and a support for said device pivotally connected to a fixed part of the vehicle and to said device, the center of the point of connection of the support to said fixed part being at one side of a vertical line passing through the center of the point of attachment of the support to said device.

ALOYSIUS GRAHAM BRACKENBURY.